Figure 1:
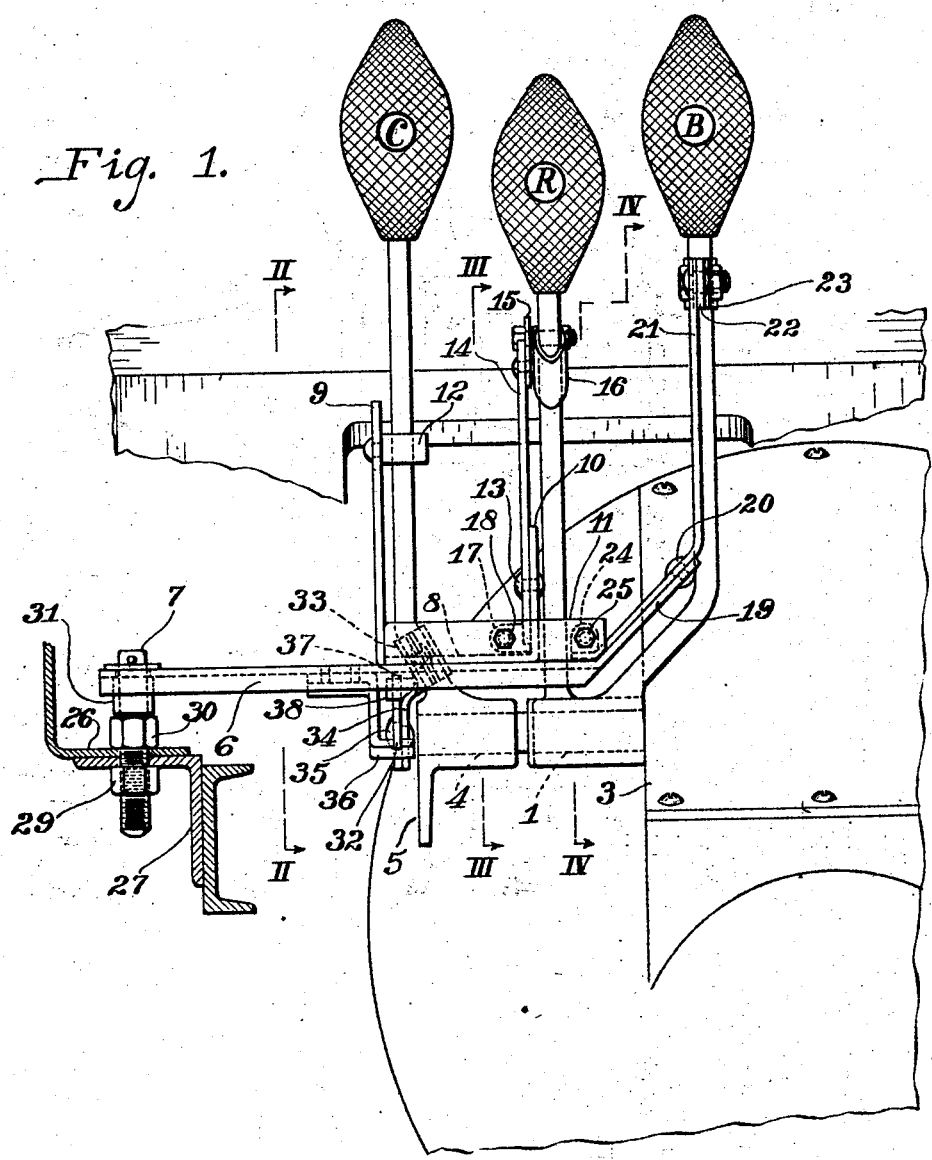

Jan. 15, 1924.

V. CHUCHEL 1,480,543

ATTACHMENT FOR GEAR SHIFTING AND BRAKING MECHANISM

Filed July 13, 1923 2 Sheets-Sheet 1

INVENTOR
Vaclav Chuchel

Jan. 15, 1924.                                                                 1,480,543
                              V. CHUCHEL
                ATTACHMENT FOR GEAR SHIFTING AND BRAKING MECHANISM
                    Filed July 13, 1923                2 Sheets-Sheet 2
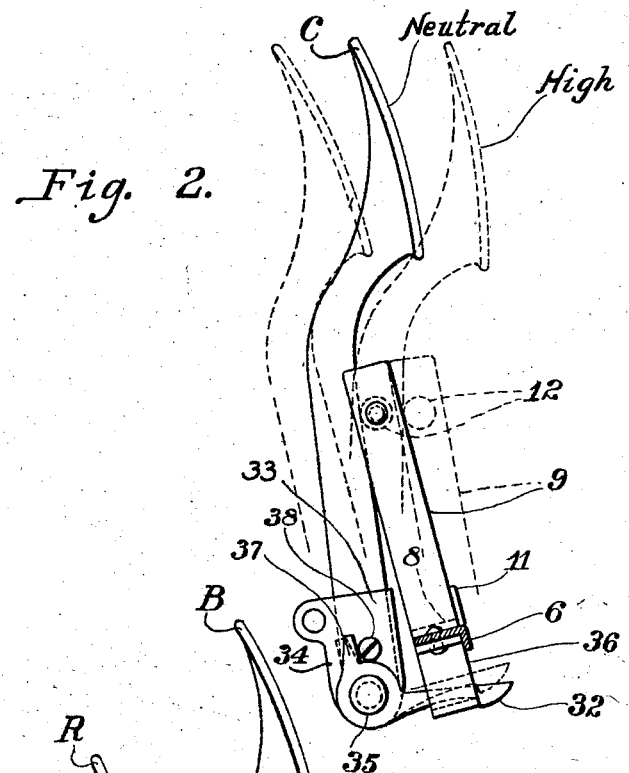
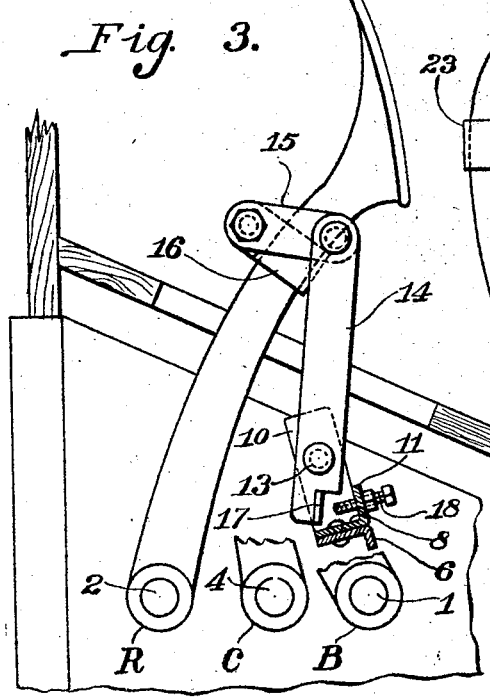
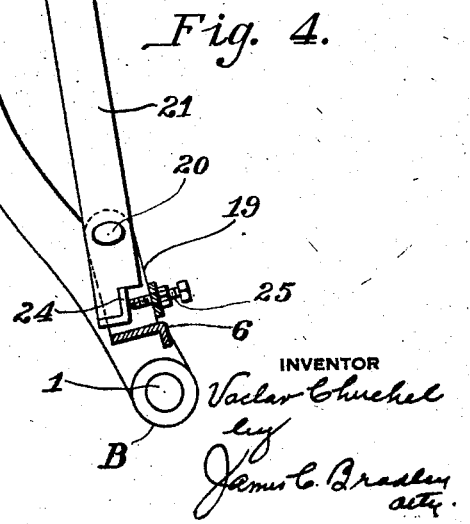
INVENTOR
Vaclav Chuchel
by
James C. Bradley
atty.

Patented Jan. 15, 1924.

1,480,543

UNITED STATES PATENT OFFICE.

VACLAV CHUCHEL, OF PITTSBURGH, PENNSYLVANIA.

ATTACHMENT FOR GEAR-SHIFTING AND BRAKING MECHANISM.

Application filed July 13, 1923. Serial No. 651,310.

*To all whom it may concern:*

Be it known that I, VACLAV CHUCHEL, a citizen of the United States, and a resident of Pittsburgh, in the county of Allegheny and State of Pennsylvania, have made a new and useful Invention in Attachments for Gear-Shifting and Braking Mechanism, of which the following is a specification.

The invention relates to an attachment for use with the gear shifting and braking mechanism of an automobile, and is particularly designed for use on Ford cars, in which the service brake and the forward and reverse movements of the car are controlled by three pedals, all of which are spring held in their rear positions. These pedals are commonly referred to as the brake pedal, the reverse pedal and the clutch pedal. With the brake pedal in its rear spring held position, this brake is released, and is applied by pushing the pedal forward. With the reverse pedal in its rear spring held position, the reverse gear drive is disconnected, and to apply such connection, the pedal is pressed forward. With the clutch pedal in its rear spring held position, the gear connection is "in high." On a forward movement of this pedal, the clutch is first shifted to neutral position (disconnecting the drive from the motor), and on a further forward movement the connection is brought into "low."

With this mechanism, and with the gear in "high," it is necessary, in stopping the car, to use both feet, first pushing the clutch pedal forward to "neutral" and then applying pressure to the brake pedal. If this order is not observed, and the brake pedal is applied first, there is danger of injury to the gears, or the engine may be stalled. Also in case the machine is standing, and it is desired to back the car, it is necessary to hold the clutch pedal forward in neutral position with one foot, while the reverse pedal is pressed forward with the other foot.

The object of my invention is to provide an attachment of very cheap simple construction, readily applicable by any purchaser, to the type of car referred to, which will simplify the operation as above set forth, rendering it easier to learn to drive the car, and reducing the danger of injury to the car in operating the gear shifting devices and the service brake. In the use of my attachment, the requirement for using both feet at the same time to operate the pedals, under the two conditions as above set forth is avoided. The attachment provides for automatically shifting the clutch pedal from "high" to neutral when the service brake is applied, thus avoiding the danger of injury to the mechanism or of stalling the engine, and further provides for shifting the clutch pedal from "high" to neutral automatically when the reverse pedal is pushed forward to operative position. The attachment also preferably includes a catch arranged to automatically engage one of the parts, when the brake pedal is applied, or when the reverse pedal is moved to reversing position, so that the operator is relieved of the effort incident holding these pedals down against the tension of the springs which normally hold the pedals in their rear positions. The catch is arranged so that it may be released by merely giving the clutch pedal a further forward movement from its neutral position. One embodiment of the invention is illustrated in the accompanying drawings wherein:

Figure 1 is a front elevation showing the invention applied to a standard reversing mechanism of the type specified. Fig. 2 is a section on the line II—II of Fig. 1, the full lines indicating the position of the clutch pedal and other parts when in "neutral," while the dotted lines indicate the other positions assumed by the pedal. And Figs. 3 and 4 are sections on the lines III—III and IV—IV respectively of Fig. 1.

Referring to the drawings, B is the brake pedal mounted on a shaft 1 connected to the service brake; R is the reverse pedal mounted on the shaft 2 extending into the gear casing 3; and C is the clutch and gear shifting pedal mounted on the shaft 4 and having connections (not shown) from the crank arm 5 to the clutch controlling shaft. As is well known, the three pedals are, in the Ford mechanism, spring held in their rear positions, the brake and reversing mechanisms being at such time in inoperative positions, and the gear being in "high." On the forward movement of the brake and reverse pedals, they are brought to operative positions, while on the forward movement of the clutch pedal, it is first brought into neutral position and then into "low."

The attachment, which is applied to this old and well known mechanism, comprises a lever 6, pivoted on the bolt 7, on which is riveted the plate 8 having at its ends the upturned arms 9 and 10, and at its rear side the flange 11 (Fig. 3). The arm 9 is provided with a laterally extending stud 12 lying immediately behind the clutch pedal and touching it when the pedal is in its rearmost position (dotted lines Fig. 2). The arm 10 has pivoted thereon at 13 the arm or lever 14, such arm having at its upper end the link 15, which is pivoted to a collar 16 secured around the reverse pedal. The lower end of the lever 14 has a laterally turned end 17 (Fig. 3) adapted to engage the screw 18 which acts as an adjustable stop.

The end of the lever 6 is inclined upwardly as indicated at 19 (Fig. 1) and carries pivoted thereon at 20, a third arm or lever 21, which is provided with a link 22, at its upper end, pivoted to the collar 23 encircling the upper end of the brake pedal B. The lower end of this arm is turned laterally as shown at 24 (Fig. 4) and engages the end of the screw 25, which acts as an adjustable stop. The brake and reverse pedals and the arms 21 and 14 are illustrated in Figs. 3 and 4 in the positions occupied when in rear or inoperative positions.

The bolt 7, on which the outer end of the lever 6 is pivoted extends through the flange 26 of the body of the machine and through the body bracket 27, the latter being secured to the channel 28 forming a part of the chassis. In applying the device, this bolt merely takes the place of the ordinary securing bolt used at this point, so that no extra holes are required, and the device may be readily applied by the purchaser. The bolt comprises a threaded lower end, on which the nut 29 is screwed, an integral head 30, and a stem above the head extending through the sleeve 31 secured in the end of the lever. A washer and cotter pin through the upper end of the bolt completes the attachment.

The operation and functioning of the attachment as thus far described and without reference, for the time being, to the catch 32 (Fig. 2), later described, is as follows. Assuming that the machine is running in "high," the three pedals are all spring held in their rear positions. In order to stop the car, it is only necessary to push forward the brake pedal B. This movement carries forward the arm or lever 21 (Fig. 4), the lower end bearing at this time against the stop screw 25, so that the lever 6 is carried forward. This forward movement of the lever 6 moves the arm 9 forward, the stud 12 contracting with the clutch pedal C, and moving it from the dotted line position marked "high" in Fig. 2 to the full line position marked "neutral." The clutch is thus brought to "neutral" or inoperative position before the brake is applied, thus relieving the operator of the necessity of applying his other foot to the clutch pedal, and avoiding the danger of injuring the driving mechanism or of stalling the engine, as sometimes otherwise happens when the brake is applied before moving the clutch pedal to neutral position.

During the forward movement of the lever 6 as above described, the reverse pedal remains unaffected, because of the pivot and arm connection 13, 14, the lever being free to move forward without swinging the arm 14 forward.

If now the brake pedal is allowed to return to inoperative position permitting the clutch pedal to return to "high," and it is desired to shift to "reverse," this is accomplished by merely pressing the reverse pedal forward, without the necessity of first pushing the clutch pedal to neutral position. The forward movement of the reverse pedal causes the lever 14 to move forward until its lower end engages the stop screw 18, after which the lever 6 is moved forward and the stud 12 on the arm engages the clutch pedal C, as before, moving it to "neutral" before the reverse pedal reaches its forward operative position. The brake pedal is not affected by this movement, because of the pivot and arm connection 20, 21, which permits the lever 6 to go forward without moving the brake pedal B.

The catch 32 is designed to relieve the operator from the necessity of holding the brake and clutch pedals, or the reverse and clutch pedals, forward against the tension of the springs. This catch is pivoted to swing freely on the end of the clutch shaft 4. This is preferably accomplished by the use of a collar 33 clamped around the lower end of the clutch pedal C and provided with a part 34 provided with the pivot 35 opposite the end of the shaft. The lever 6 has depending from it a bracket 36 which co-operates with the catch. When the lever is pushed forward to bring the clutch pedal to the neutral (full line) position of Fig. 2, the catch engages the bracket and locks the lever against rearward movement. Thus, if the brake pedal has been moved forward shifting the clutch pedal to neutral position and applying the brake, the clutch pedal is retained in this position after the operator releases the pressure on the brake pedal. This relieves him of the effort of holding the pedal forward for protracted periods of time. Similarly when the reverse pedal is pushed forward, thus bringing the clutch pedal to neutral position, the catch holds the lever 6 and the clutch pedal forward at neutral position until released.

In order to secure the release of the catch, it is provided with a finger 37, which is engaged by a pin 38 projecting from the sides of the collar 33 when the clutch pedal is moved forward toward "low" from neutral position, the dotted lines in Fig. 2 indicating the release of the catch due to the movement of the pedal to the left from neutral position. It is thus possible to release the catch by merely giving the clutch pedal a slight forward movement from its neutral position.

What I claim is:

1. In combination with the gear shifting and braking mechanism of an automobile including a brake pedal normally spring held at back or rear position, and a clutch and gear shifting pedal normally spring held at rear position with the gear "high," and adapted at its next forward position to bring the clutch to release or neutral position, of an attachment comprising a lever pivoted to the framework or body of the car on the outer side of the clutch pedal and extending transversely of the two pedals, means connecting the inner end of the lever to the brake pedal, and means carried by the lever intermediate its ends for engaging the clutch pedal and moving it from high to neutral position when the brake pedal is pressed forward and before the brake is applied.

2. In combination with the gear shifting and braking mechanism of an automobile including a brake pedal normally spring held at back or rear position, a clutch and gear shifting pedal normally spring held at rear position with the gear in "high" and adapted at its next forward position to bring the clutch to release or neutral position and at its next forward position to bring the gear into "low," and a reverse pedal normally spring held in rear or neutral position and adapted on its forward movement to bring the gear into "reverse," of an attachment, comprising a lever pivoted to the framework or body of the car and extending transversely of the three pedals, connections from the lever to the brake and reverse pedals, and means carried by the lever, for engaging the clutch pedal and moving it from its rear position to neutral position either when the brake pedal is pushed forward to braking position, or when the reverse pedal is pushed forward to reversing position.

3. In combination with the gear shifting and braking mechanism of an automobile including a brake pedal normally spring held at back or rear position, a clutch and gear shifting pedal normally spring held at rear position with the gear in "high" and adapted at its next forward position to bring the clutch to release or neutral position and at its next forward position to bring the gear into "low," and a reverse pedal normally spring held in rear or neutral position and adapted on its forward movement to bring the gear into "reverse," of an attachment, comprising a lever pivoted to the framework or body of the car and extending transversely of the three pedals, connections from the lever to the brake and reverse pedals, comprising a pair of upright levers pivoted intermediate their ends to the first lever and adapted to bear against such lever at their lower ends when their upper ends are moved forward, and connected at their upper ends to said brake and reverse pedals, and means carried by the lever, for engaging the clutch pedal and moving it to neutral position on the forward movement of the brake or reverse pedal.

4. In combination with the gear shifting and braking mechanism of an automobile including a brake pedal normally spring held at back or rear position, and a clutch and gear shifting pedal normally spring held at rear position with the gear in "high," and adapted at its next forward position to bring the clutch to release or neutral position, of an attachment comprising a lever pivoted to the framework or body of the car on the outer side of the clutch pedal and extending transversely of the two pedals, means connecting the inner end of the lever to the brake pedal, means carried by the lever intermediate its ends for engaging the clutch pedal and moving it from high to neutral position when the brake pedal is pressed forward, and an automatic engaging catch for holding the lever in forward position.

5. In combination with the gear shifting and braking mechanism of an automobile including a brake pedal normally spring held at back or rear position, and a clutch and gear shifting pedal normally spring held at rear position with the gear in "high," and adapted at its next forward position to bring the clutch to release or neutral position, of an attachment comprising a lever pivoted to the framework or body of the car on the outer side of the clutch pedal and extending transversely of the two pedals, means connecting the inner end of the lever to the brake pedal, means carried by the lever intermediate its ends for engaging the clutch pedal and moving it from high to neutral position when the brake pedal is pressed forward, an automatically engaging catch for holding the lever in forward position, and means actuated on a further forward movement of the clutch and gear shifting pedal for releasing said catch.

6. In combination with the gear shifting and braking mechanism of an automobile including a brake pedal normally spring held at back or rear position, and a clutch and gear shifting pedal normally spring held at rear position with the gear in "high,"

and adapted at its next forward position to bring the clutch to release or neutral position, of an attachment comprising a lever pivoted to the framework or body of the car on the outer side of the clutch pedal and extending transversely of the two pedals, means connecting the inner end of the lever to the brake pedal, means carried by the lever intermediate its ends for engaging the clutch pedal and moving it from high to neutral position when the brake pedal is pressed forward, an automatically engaging catch pivoted on the shaft of the clutch and gear shifting pedal for holding the lever in forward position, and means carried by the clutch and gear shifting pedal for releasing said catch when said pedal is moved forward from neutral position.

7. In combination with the gear shifting and braking mechanism of an automobile including a brake pedal normally spring held at back or rear position, a clutch and gear shifting pedal normally spring held at rear position with the gear in "high" and adapted at its next forward position to bring the clutch to release or neutral position and at its next forward position to bring the gear into "low," and a reverse pedal normally spring held in rear or neutral position and adapted on its forward movement to bring the gear into "reverse," of an attachment, comprising a lever pivoted to the framework or body of the car and extending transversely of the three pedals, connections from the lever to the brake and reverse pedals, means carried by the lever for engaging the clutch pedal and moving it from its rear position to neutral position either when the brake pedal is pushed forward to braking position, or when the reverse pedal is pushed forward to reversing position, and an automatically engaging catch for holding the lever in forward position.

8. In combination with the gear shifting and braking mechanism of an automobile including a brake pedal normally spring held at back or rear position, a clutch and gear shifting pedal normally spring held at rear position with the gear in "high" and adapted at its next forward position to bring the clutch to release or neutral position and at the next forward position to bring the gear into "low," and a reverse pedal normally spring held in rear or neutral position and adapted on its forward movement to bring the gear into "reverse," of an attachment, comprising a lever pivoted to the framework or body of the car and extending transversely of the three pedals, connections from the lever to the brake and reverse pedals, means carried by the lever for engaging the clutch pedal and moving it from its rear position to neutral position either when the brake pedal is pushed forward to braking position, or when the reverse pedal is pushed forward to reversing position, an automatically engaging catch for holding the lever in such forward position, and means actuated on a further forward movement of the clutch and gear shifting pedal for releasing said catch.

In testimony whereof, I have hereunto subscribed my name this 11th day of July, 1923.

VACLAV CHUCHEL.